3,012,822
WHEEL TRIM RETAINING CLIP
William A. Mulhern, Detroit, Mich., assignor to Gar Wood Industries, Inc., Wayne, Mich., a corporation of Michigan
Filed Feb. 26, 1958, Ser. No. 717,717
4 Claims. (Cl. 301—37)

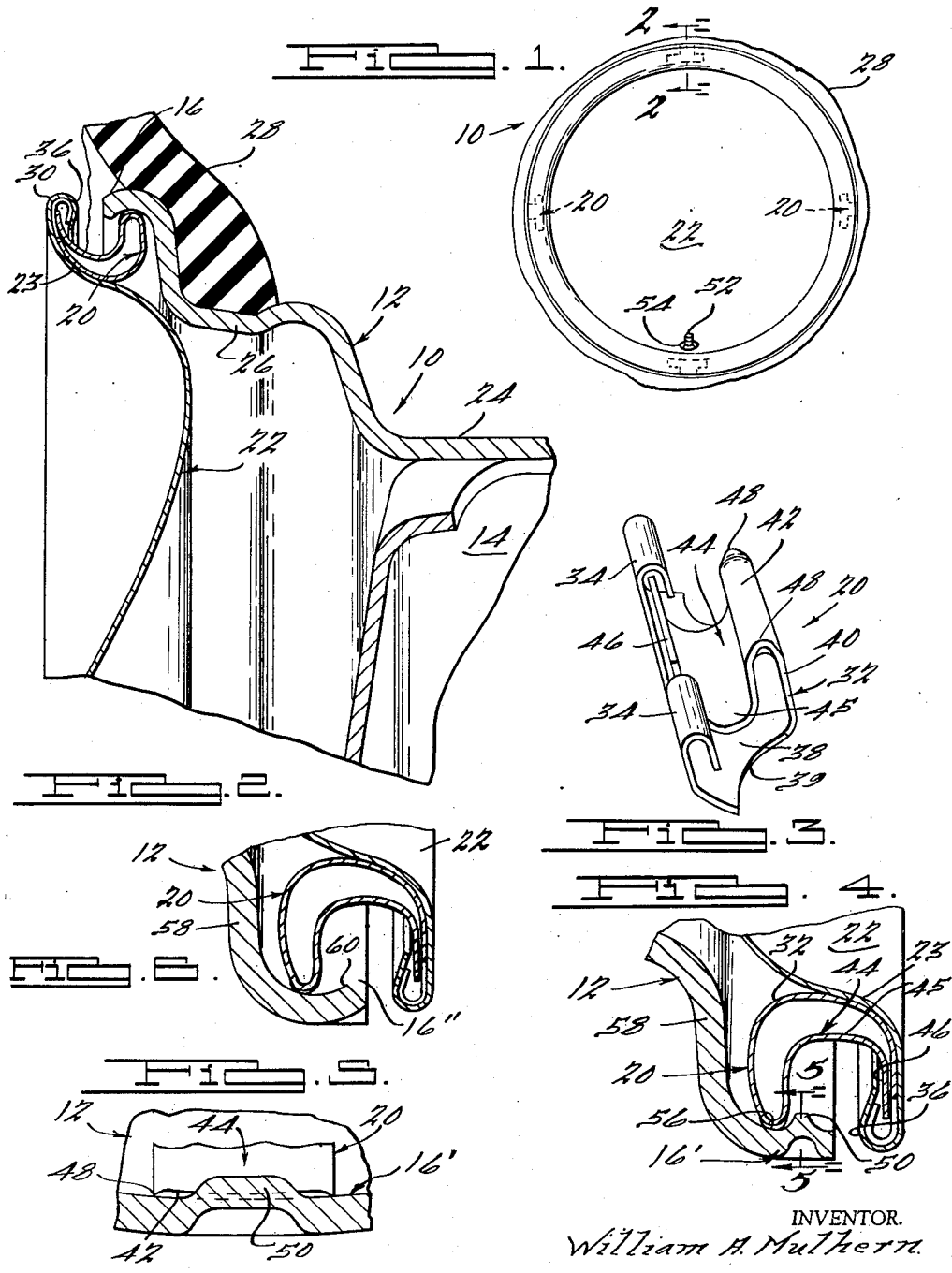

This invention relates to improved wheel trim retaining devices, and more particularly to an improved spring clip for retaining a wheel trim member, or cover upon the face of an automobile wheel.

One important object of the present invention is to provide an improved wheel trim retaining clip capable of securely retaining a trim member on an automobile wheel during even relatively rough service use.

Another object is to provide an improved retaining clip for an automobile wheel trim member engageable on the terminal rim flange of the wheel for securely holding the trim member on the wheel yet still being readily removable for service purposes.

A further object is to provide an improved one-piece spring clip for retaining a wheel trim member on an automobile wheel, including a main portion and an auxiliary portion, the auxiliary portion being effective to provide a dual spring rate effect in the clip, increasing the resistance to axial movement of the trim member relative to the wheel, without correspondingly increasing the resistance to radial movement, and also assuring an improved stress distribution in the main portion of the clip, thereby protecting it against stretching beyond its elastic limit and acquiring a permanent set.

A still further object is to provide an improved spring clip for retaining a wheel trim member on an automobile wheel, which provides a relatively high resistance to movement of the trim member both toward and away from the wheel, yet which permits the cover to be removed from the wheel for servicing when desired without damage either to the cover or to the clips.

These and other objects are accomplished by the present invention according to which a wheel trim member is retained upon the face of a wheel of the type having an outturned terminal rim flange by a plurality of unitary spring clips of double U-shaped form. The two U-shaped portions of each clip are nested one within the other, and their axially inner legs are joined together to form a rounded nose portion for engagement with the wheel rim. The clip is rigidly secured near the outer edge of the trim member, which is shaped to back up and stiffen a part of the large U-shaped spring portion, thereby reducing the effective axial cantilever arm of the large U relative to the small U. The large U provides the principal initial resistance to radial movement of the trim member on the wheel, and for small movements in a radial direction the small U has little effect. The small U serves two principal functions. First, it provides increased resistance to axial movement of the trim member relative to the wheel, and second, upon relatively large radial movements which tend to spread open the large U, it reinforces the large U, and protects it against stretching beyond its elastic limit and acquiring a permanent set.

The small U-shaped spring portion increases the resistance to axial movement of the trim member with respect to the wheel, without significantly increasing the effective resistance of the clips to small radial movements relative to spring clips having but a single spring element. The clip of the present invention is relatively simple in design, durable in service, and economical to manufacture.

The invention will now be described in greater detail in connection with the accompanying drawing of which:

FIGURE 1 is a fragmentary elevational view of an automobile wheel including an ornamental wheel trim member secured to the wheel by four clips according to the present invention;

FIG. 2 is a fragmentary cross-sectional view of the wheel as shown in FIG. 1, taken along the section line 2—2 thereof;

FIG. 3 is a perspective view of a spring clip according to the present invention, showing the clip apart from the wheel trim member;

FIG. 4 is a fragmentary cross-sectional view of a wheel having a differently shaped terminal flange from the wheel illustrated in FIG. 2, and including a wheel trim member secured thereon by spring clips according to the present invention;

FIG. 5 is a longitudinal sectional view of the wheel shown in FIG. 4, taken generally along the section line 5—5 thereof; and FIG. 6 is a fragmentary cross-sectional view of a wheel rim of the same type as the rim shown in FIGS. 4 and 5 but provided with different means for receiving the spring clips of the present invention.

Referring now to the drawing, a conventional automobile wheel 10 is illustrated in FIGS. 1 and 2 including a drop center rim 12 securely affixed to a load bearing body portion 14. The rim 12 has an axially extending, curled terminal flange 16 which is engaged by the clip 20 of the present invention for retaining a wheel trim member, such as the cover 22 illustrated on the face of the wheel. The details of the wheel construction, except for the presence of the axially extending terminal rim flange 16 are in no way critical with respect to the present invention and may be varied as desired. Typically, as shown, the rim 12 includes a drop center portion 24 and intermediate axial flange portions 26, which support a pneumatic tire 28.

The sheet metal wheel cover 22, which includes an axially inwardly extending portion 23 adjacent to its outer edge, and which in all other respects may be of any desired ornamental shape is mounted upon the outer face of the wheel in overlying relationship thereto. The cover 22 is of approximately the same diameter as the terminal rim flange 16 so that when it is positioned upon the wheel it substantially completely covers the wheel and conceals it. Insofar as the practice of the present invention is concerned, the cover 22 need not be disc shaped as illustrated, but may be in the form of a ring or annulus.

The cover 22 is secured to the wheel 10 by a plurality of clips 20, the number of which is not critical, four being shown illustratively. Preferably, at least three of the clips 20 equally spaced around the cover 22 are used to insure stability of the cover on the wheel during operation. The clips 20 are rigidly fixed to the cover and extend axially toward the wheel into engagement with the terminal rim flange 16, holding the outer edge 30 of the cover spaced apart from the rim flange 16. The cover 22 is preferably spaced slightly away from the wheel 10 in order to minimize the generation of noise during operation, to permit air to circulate freely through the wheel, and to prevent trapping of water and dirt between the cover and the wheel.

The spring clips 20, as perhaps best shown in FIG. 3, are of unitary construction, being formed of a single piece of spring steel. Each one of the clips includes a first, relatively large, generally U-shaped spring portion 32, the axially outer leg 34 of which is firmly secured along the outer edge of the cover 22. The clips 20 may be welded to the cover or, as illustrated, they may be clinched in a terminal bead 36 on the cover. As shown, the outer leg 34 of the large U-shaped portion 32 is folded over and fitted within the bead 36, which is then firmly pressed to clinch the clips securely and permanently in position on the cover 22. In order to facilitate clinching the clip in the cover bead, to reinforce the cover bead 36, and to provide ample engagement of the clip within the bead, the outer leg 34 is preferably made relatively wide and is also preferably bifurcated as illustrated. This arrangement provides a relatively strong connection between the cover 22 and the clip 20, which is highly resistant to rocking movement of the clip relative to the cover about an axis parallel to the wheel axis, and which secures the clip permanently to the cover even when the cover is made of relatively thin sheet metal. It also makes the leg 34 readily accessible to a clinching tool for securing the clip to the cover, and provides clearance for the outer leg 46 of the second U-shaped portion 44.

The bight portion 38 of the large U 32 is preferably tapered inwardly, as indicated at 39, from the relatively wide outer leg 34 to the relatively narrow inner leg 40. This provides clearance for mounting wheel balancing weights (not shown) upon the rim flange 16 closely adjacent to the nose 42 of the clip.

The outer leg 34 and a portion of the bight portion 38 of the large U are backed up by the axially inwardly extending portion 23 of the cover. The effective cantilever arm of the large U with respect to radially inward deflections is thereby reduced, since only a portion of the bight portion 38 is free to flex radially inwardly.

The axially inner end of the large U 32 terminates at a radially outwardly facing nose 42 which normally is engaged within the terminal rim flange 16. The second, or small U-shaped portion 44 extends radially inwardly from the nose 42, being nested within the large U 32, and terminates in a radially outwardly extending outer leg 46, which is caught within the terminal flange 36 of the trim member 22 when the clip is attached thereto. The outer leg 46 of the small U need not be rigidly secured to the trim member 22, but may be merely held loosely thereagainst by the terminal flange 36 for limited sliding movement radially with respect to the trim member 22.

The nose 42 is preferably struck outwardly at its ends to provide anti-indexing tangs 48 which bite into the rim flange 16 to prevent indexing, i.e., to prevent rotation of the cover 22 with respect to the wheel 10 about the wheel axis.

In operation, during application and removal of the cover 22 from the wheel, and during flexing of the wheel relative to the cover such as may be occasioned by striking road obstructions and the like, the spring clip 20 provides a dual spring action substantially different from the action of any known prior art retaining clip. The small U-shaped portion 44 acts to reinforce the large U-shaped portion 32 in a special way. The small U 44 flexes relatively easily in response to radial movement of the nose 42 relative to the cover 22, since its bight portion 45 is not reinforced and is free to bend over its entire length. The legs of the U-shaped portion 44, however, are relatively short, and, accordingly, the small U offers relatively strong resistance to axial movement of the nose 42. The small U 44 reinforces the large U 32 against any tendency to spread open beyond its normal configuration, and also provides direct resistance to axial displacement of the cover 22 relative to the wheel.

Resistance to radial deflection is provided primarily by the large U 32, the axial cantilever arm of which is effectively shortened by the back-up portion 23 of the cover. The small U 44 reinforces the large U against its tendency to spread open in response to relatively large deflections, thereby protecting it against stretching beyond its elastic limit and acquiring a permanent set under abnormal loads. The small U also directly resists axial deflection, and thereby increases the resistance of the cover to application to and removal from the wheel, without unduly stiffening the clips against radial deflections or limiting the extent of such radial deflections.

During the initial portion of the travel of the nose 42 in a radial direction away from its normal position relative to the cover, that is, on relatively small deflections, the small U 44 has little effect and permits relatively free radial movement of the nose 42, as if it were carried by the large U 32 alone. When the nose 42 is moved relatively far from its normal position, that is, on relatively large deflections in a radial direction, the two legs of the large U tend to spread apart, and the small U 44 comes into play, reinforcing the large U 32 by resisting that spreading tendency. In a clip without the small U 44, the large U is apt to be stressed beyond its elastic limit, and thus to acquire a permanent set. With the small U 44, this effect is avoided, since on large deflections an improved strain distribution is achieved.

The resistance of the cover 22 both to application to and removal from the wheel is relatively high, yet the clips are sufficiently flexible to permit a relatively high degree of displacement of the nose 42 relative to the cover without bending the cover or loosening the clips therefrom. Also, the cover may be removed by the use of a conventional pry tool inserted between the rim flange 16 and the terminal flange 36 of the cover at any point around the periphery of the cover.

As shown in FIGS. 4 and 5, spring clips 20 according to the present invention are also suitable for use in securing a trim member 22 upon a wheel of a type having a straight terminal rim flange 16'. This flange 16' projects straight outwardly without a radially inward curl, such as the rim flange 16 illustrated in FIG. 2. In this case, a series of radially inwardly extending bumps 50 are struck from the flange 16' at intervals equal to the spacings of the clips 20 around the trim member. The bumps 50 are spaced outwardly from the radial flange 58 of the rim and in conjunction therewith define short, circumferential grooves 56 for receiving the clips. Proper alignment of the clips 20 with the bumps 50 may be assured by aligning both the clips and the bumps with reference to the valve stem 52, which projects through an aperture 54 in the trim member 22. In operation, when the cover is applied or removed from the wheel the nose 42 of the clips snap over the bumps 50 into the groove or recess 56 between the bumps 50 and the radial flange 58 of the rim.

An alternative arrangement for use with the straight terminal rim flange is shown in FIG. 6, wherein tabs 60 are cut from the terminal flange 16" and curled radially inwardly to receive the clips 20. These tabs 60 are spaced around the wheel similarly to the bumps 50 and function in the same way to retain the clips 20 when the cover 22 is placed on the wheel.

What is claimed is:

1. In combination with an automobile wheel trim member, a retaining clip for removably securing the member upon an automobile wheel of the type having an axially outwardly extending rim flange, said clip comprising a relatively large U-shaped spring element and a relatively small U-shaped spring element in a generally nested arrangement, the axially inner ends of said elements being integrally joined together and constituting a nose for engaging the rim flange on the wheel, the outer end of the larger one of said elements being rigidly secured to the trim member, the axially outer end of the smaller one of said elements being retained adjacent to the trim member, and an axially extending portion of said larger element being backed up by an axially extending portion of said trim member.

2. In combination with an automobile wheel trim member of the type having an axially inwardly extending portion adjacent to its outer peripheral edge, a retaining clip for removably securing said member upon an automobile wheel of the type having an axially outwardly extending rim flange, said clip comprising a sheet metal spring rigidly secured at its axially outer end to the trim member near the outer edge thereof and having two spaced apart similarly oriented elements of relatively different size and of U-shaped cross section defined by spaced leg portions connected by bight portions, respectively, said elements being arranged in a nested arrangement, the legs of said elements remote from said trim member being joined to form a nose positioned for engagement with the rim flange on the wheel, and the bight portion of the larger one of said elements being backed up over a portion of its length by said inwardly extending portion of the trim member.

3. In combination with an automobile wheel trim member, a retaining clip for removably securing said member upon an automobile wheel of the type having an axially outwardly extending rim flange, said clip comprising a sheet metal spring having two U-shaped portions of unequal length joined together at one end to form a nose positioned to engage the rim flange on the wheel and extending in generally the same direction therefrom toward said trim member to which they are secured at adjacent points, the larger one of said portions being rigidly secured to said trim member, and the smaller one of said portions being engageable with said trim member for limited radial movement with respect thereto.

4. In combination with an automobile wheel trim of the type having an inwardly turned terminal flange, a retaining clip for removably retaining said trim on an automobile wheel of the type having an axially extending rim flange and a portion projecting radially inwardly at the outer part of said rim flange, said clip comprising a pair of U-shaped springs in a generally nested arrangement, one of said springs being substantially smaller than the other one, one leg of the larger spring being bifurcated and being rigidly crimped within the terminal flange of the trim, one leg of the smaller spring being loosely caught between said terminal flange and the body of the trim, the opposite legs of said springs being integrally joined together to form a nose for engaging said rim flange, said clip being resiliently deflectable to allow said nose to pass over said inwardly projecting portion and to resiliently engage the rim flange therebehind.

References Cited in the file of this patent
UNITED STATES PATENTS

| | | |
|---|---|---|
| 2,055,047 | Place | Sept. 22, 1936 |
| 2,605,530 | Slemmons | Aug. 5, 1952 |
| 2,652,287 | Lyon | Sept. 15, 1953 |
| 2,910,323 | Spisak | Oct. 27, 1959 |